3,058,972
POLYMERIZATION OF ETHYLENE

Robert Fourcade, Gosnay, Charles Cousin and Thérèse Van De Walle, Labuissiere, and Adrien Nicco, Verneuil en Halatte, France, assignors to Societe Anonyme dite: Societe Normande de Matieres Plastiques, Douai, France
No Drawing. Filed July 11, 1958, Ser. No. 747,813
Claims priority, application France July 20, 1957
6 Claims. (Cl. 260—94.9)

This invention relates to methylene polymerizing processes.

More particularly, the invention relates to that general method of ethylene polymerization known as the Ziegler process, wherein ethylene is polymerized at ordinary pressure in the presence of catalysts of the class comprising the reaction products of metal-alkyle with metal halides, for example, as disclosed in detail in United States Letters Patent No. 2,846,427. One such catalyst, mentioned by way of example, is the reaction product of aluminium-triethyl with titanium tetrachloride.

In such processes, the possibility is available of controlling the molecular mass of the final polymer products, by varying the alkyl-to-titanium tetrachloride ratio in the reaction mixture from which the catalyst is derived, it being noted that the molecular mass of the final polymer is measured as the inherent viscosity value of the polymer.

However, in conventional processes of the type specified, the yield, expressed as the ratio of the weight of polymer to the weight of aluminium-alkyl used, is limited to a maximum of 200, and but rarely exceeds 100. The period of activity of such catalysts moreover is quite short, so that the polymerization proceeds suddenly and is brought to a prompt stop.

The surprising discovery has now been made that the defective characteristics of such polymerization catalysts, as regards poor yield and short activity, can be very favourably modified through the addition of silicone oils, preferably but not necessarily containing in suspension therein at least one powder metal or metal alloy. The modifying composition may be added either during preparation of the catalyst, or together with the catalyst, or further during the actual polymerization of the ethylene.

Silicone oils have the general formula

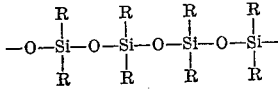

wherein the R groups may be alkyls (e.g. —CH3) or aryls (e.g. C₆H₅). The relative proportion of the alkyl and aryl groups may vary over a wide range as from 1/100 to 100/1.

The proportion of silicone oils used according to the invention is from 0.4 to 4 times the weight of aluminium alkyl used in preparing the catalyst.

As the metals and alloys usable in accordance with the invention as additions to the silicone oils, zinc and zinc-copper alloys are satisfactory, e.g. zinc-copper alloys containing from 90% to 10% Cu and from 10% to 90% Zn, a preferred proportion being 70% Cu and 30% Zn. The metal or alloy addition should be finely pulverized, e.g. to a particle size of from 5 to 500 microns, and preferably to within 10 to 50 microns. The proportion of the metal or alloy powder to the alkyl-aluminium used may be in the range from 0.1/1 to 4/1.

Use of the modified catalyst according to the invention leads to the following beneficial results:
Increased rate of ethylene polymerization;
Increased yield, yields as high as 1100 to 1200 being attainable; and
Increased inherent viscosity in the final polymer product, and hence in the molecular mass thereof, for a given value of the alkyl to titanium ratio used.

Furthermore, in cases where the reaction rate is greatly retarded, that is, where the amount of ethylene absorbed per unit time is too low due to inadvertent presence of some impurity into the reaction medium, the use of the modified catalyst according to the invention is found to result in a resumption of the normal rate of ethylene absorption.

The ensuing examples are given for the sole purpose of illustrating some possible procedures by which the invention may be carried into practice, but are not intended to limit the scope thereof.

Examples 1 to 3 illustrate the action of a silicone oil used alone, and added into the system at various stages. Examples 4 to 6 similarly describe the addition of a metal or alloy into the modified catalyst at various stages of the process.

EXAMPLE I
Preparation of Catalyst

Into 1.5 liters of anhydrous cyclohexane containing 2.71 g. aluminium-chlorodiethyl, 6.12 g. of titanium tetrachloride, then 1 gram silicone oil are added. The silicone oil used is the commercial product sold as S.I. 550 R by Société Saint-Gobain. Such silicone oil is a polysiloxane in which the organic radical comprises one third of the molecules of the phenyl radical and two-thirds of the methyl radical, and which has a viscosity of 1.0 poise. After stirring for a quarter hour at 70° C., cyclohexane is added to provide a total volume of 15 liters.

The alkyl molecule/titanium ratio is 0.7.

Ethylene is added to this solution and the temperature is maintained in the range 63° to 68° C. with agitation.

Four hours after addition of the ethylene, the reaction is discontinued, and after treatment of the polyethylene formed 2000 grams of the polyethylene are obtained.
Melting point: 125–128° C.
Inherent viscosity: 2.1.
Polymer/aluminium-alkyl yield: 740.
Average absorption rate: 500 grams/hr.

When a similar run is effected without addition of silicone according to the invention, i.e. by the conventional Ziegler process, only 350 grams are obtained, of a polyethylene having the following characteristics:
Melting point: 117°–125° C.
Inherent viscosity: 1.1.
Polymer/aluminium alkyl yield: 130.
Average absorption rate: 85 g./hr.

EXAMPLE II
Addition of Silicone Oil at Start of Polymerization

To 1.5 liters anhydrous cyclohexane containing 2.71 g. of aluminium-chlorodiethyl, 6.12 grams of TiCl₄ are added. The mixture is stirred 15 minutes at 70° C., and cyclohexane is added to make up 15 liters.

Ethylene is added into this solution and the temperature is maintained at 63–68° C. with continued agitation. Five minutes later, 2 grams of silicone oil are added, of the same type as in Example I.

Four hours after the addition of the polyethylene the reaction is discontinued. 2700 grams of polyethylene are obtained which after conventional treatment has the following characteristics:
Melting point: 125–128° C.
Inherent viscosity: 3.1.
Polymer aluminium-alkyl yield: 1000.
Average absorption rate: 675 g./hr.

EXAMPLE III

Addition of Silicone Oil During Polymerization

To 1.5 liter cyclohexane containing 2.71 grams aluminium-chlorodiethyl there are added 6.12 grams titanium tetrachloride. The mixture is stirred 15 minutes at 70° C. and cyclohexane is added to make a volume of 15 liters. The ethylene is added while maintaining the temperature at 64–68° C. During the first hour the average absorption rate is about 100 g./hr. At that time 3 grams silicone oil are added. The absorption rate of the ethylene quickly rises to a value of 650–700 g./hr.

After four hours the operation is arrested. There are obtained 2000 grams polyethylene having the following characteristics:

Melting point: 125–128° C.
Inherent viscosity: 1.9.
Polymer aluminium-alkyl yield: 740.
Average absorption rate: 500 g./hr.

EXAMPLE IV

Influence of Zinc Addition 0.5 gram of powder zinc in 1 cc. of silicone are added to 1.5 liter cyclohexane containing 2.71 grams aluminium-chlorodiethyl. Immediately thereafter 6.12 grams titanium tetrachloride are added. After agitation cyclohexane is added to make up 15 liters.

The ratio alkyl/titanium is 0.7.

Ethylene is added to the solution and the temperature is maintained at 70° C. with agitation. Four hours after addition of the polyethylene the treatment is arrested. 3,240 grams polyethylene are obtained having the following characteristics:

Melting point: 125–128° C.
Inherent viscosity: 2.76.
Polymer/aluminium-alkyl yield: 1190.
Average absorption rate: 810 g./hr. ethylene.

When using the same procedure with the conventional Ziegler method, i.e. without addition of the silicone-zinc modifier, only 350 grams polyethylene were obtained, with the following characteristics:

Melting point: 124–128° C.
Inherent viscosity: 1.6.
Polymer/aluminium-alkyl yield: 130.
Average ethylene absorption rate: 90 grams/hr.

EXAMPLE V

Influence of Brass Addition 0.5 gram powder brass in 3 grams silicone oil are added to 1.5 liter cyclohexane containing 2.71 g. aluminium-chlorodiethyl. Thereupon 5.34 grams TiCl₄ are added, the ratio alkyl/Ti being 0.8. The mixture is stirred and cyclohexane is added to make up 15 liters. The ethylene is then added and a temperature of 65° C. is maintained with agitation. At the end of 5 hours of this polymerization treatment the resulting polyethylene weighing 3.100 grams is washed and dried, and is found to have the following characteristics:

Melting point: 125–128° C.
Inherent viscosity: 4.9.
Polymer-aluminium-alkyl yield: 1150.
Average absorption rate: 620 g./hr.

A similar test when performed without addition of brass into the silicone yields 400 grams polyethylene, having the following characteristics:

Melting point: 124–128° C.
Inherent viscosity: 2.1.
Polymer/aluminium-alkyl yield: 150.

EXAMPLE VI

Influence of Brass Addition During the Process 2.71 grams aluminium-chlorodiethyl are dissolved in 1.5 liter cyclohexane. 6.12 grams titanium tetrachloride are reacted therewith, and cyclohexane is added to make up 15 liters. The ethylene is added with continued agitation. The ethylene polymerizes at a rate of 100 to 150 grams per hour. 1 gram of powder brass in 4 g. silicone oil of the same grade as specified above is added. 10 minutes after this addition a great increase is noted in the polymerization rate which rises to 700–750 g./hr. and retains that value consistently for four hours. At the end of this time there are obtained 3.100 grams of a polyethylene having the following characteristics:

Melting point: 125–129° C.
Inherent viscosity: 2.4.
Polymer/alkyl-aluminium yield: 1150 grams.

What we claim is:

1. In the method of producing polyethylene by polymerizing ethylene in the presence of a Ziegler catalyst which is the reaction product of aluminum-chlorodiethyl and titanium tetrachloride; the step of adding a silicone oil having the general formula

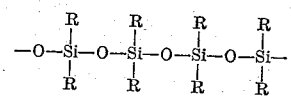

wherein R represents a radical selected from the group consisting of alkyls and aryls, with the ratio of alkyl to aryl groups in the silicone oil being in the range of from 1/100 to 100/1, and with the weight of the silicone oil being in the range of from 0.1 to about 4 times the weight of the aluminum-chlorodiethyl used in the preparation of said reaction product.

2. The method as in claim 1; further including the step of adding powder metal selected from the group consisting of zinc and zinc-copper alloy, with the weight of the added powder metal being from 0.1 to 4 times said weight of the aluminum-chlorodiethyl used in the preparation of said reaction product.

3. The method as in claim 2; wherein said powder metal is added to the mixture of aluminum-chlorodiethyl and titanium tetrachloride.

4. The method as in claim 2; wherein said powder metal has an average particle size within the range from 5 to 500 microns.

5. The method as in claim 2; wherein said powder metal has an average particle size within the range from 10 to 50 microns.

6. The method as in claim 2; wherein said zinc-copper alloy contains approximately 70 percent copper and 30 percent zinc, by weight.

References Cited in the file of this patent

UNITED STATES PATENTS

| | | |
|---|---|---|
| 2,441,214 | Thomas et al. | May 11, 1948 |
| 2,846,427 | Findlay | Aug. 5, 1958 |

FOREIGN PATENTS

| | | |
|---|---|---|
| 874,215 | Germany | Apr. 20, 1953 |

OTHER REFERENCES

Derwent Belgian Patent Report No. 52 A, 573, 649, page A–12, Mar. 31, 1959.